United States Patent

[11] 3,610,286

| [72] | Inventors | Harold E. McGowen, Jr.;<br>Howard M. King, both of Houston, Tex. |
|---|---|---|
| [21] | Appl. No. | 869,683 |
| [22] | Filed | Oct. 27, 1969 |
| [45] | Patented | Oct. 5, 1971 |
| [73] | Assignee | Camco, Incorporated<br>Houston, Tex. |

[54] ORIFICE VALVE ASSEMBLY
6 Claims, 6 Drawing Figs.

[52] U.S. Cl. ................................................ 138/44,
137/327, 251/148, 251/316
[51] Int. Cl. ........................................................ F15d 1/02
[50] Field of Search ............................................ 137/315,
316, 327, 328; 251/148, 150, 151, 152, 304, 309,
310, 316; 138/44

[56] References Cited
UNITED STATES PATENTS

| 3,112,758 | 12/1963 | Norton ......................... | 137/315 |
| 3,195;560 | 7/1965 | Pofit ............................. | 137/315 |
| 3,249,117 | 5/1966 | Edwarde ...................... | 137/315 |
| 3,419,045 | 12/1968 | King, Jr. ....................... | 137/327 X |

*Primary Examiner*—M. Cary Nelson
*Assistant Examiner*—David R. Matthews
*Attorneys*—James F. Weiler, Jefferson D. Giller, William A. Stout, Paul L. De Verter, II, Dudley R. Dobie, Jr. and Henry W. Hope ABSTRACT: The improvement in an orifice valve assembly having a rotary plug valve carrying an orifice plate therein for use in a conduit for measuring the fluid flow therethrough by providing two stems integrally connected to the valve plug for preventing any floating action of the plug when operating under line pressure fluctuations. The second stem having an orifice plate slot extending axially and transversely entirely through the second stem with the body having a circular recess for receiving and supporting the second stem. The body including a groove of a width less than the diameter of the recess with the second stem including two flat parallel sides which when aligned with the groove allows insertion of the second stem into the recess with the flat sides being at an axial angle to both the valve plug open and close positions thereby providing bearing surfaces for the second stem in the recess. Four internal bypass openings in the valve plug extending from the upstream side to the downstream side of the valve when the orifice plate is aligned with the flow conduit.

PATENTED OCT 5 1971 3,610,286

Harold E. McGowen, Jr.
Howard M. King
INVENTORS

BY James F. Weiler
William G. Stout

ATTORNEYS

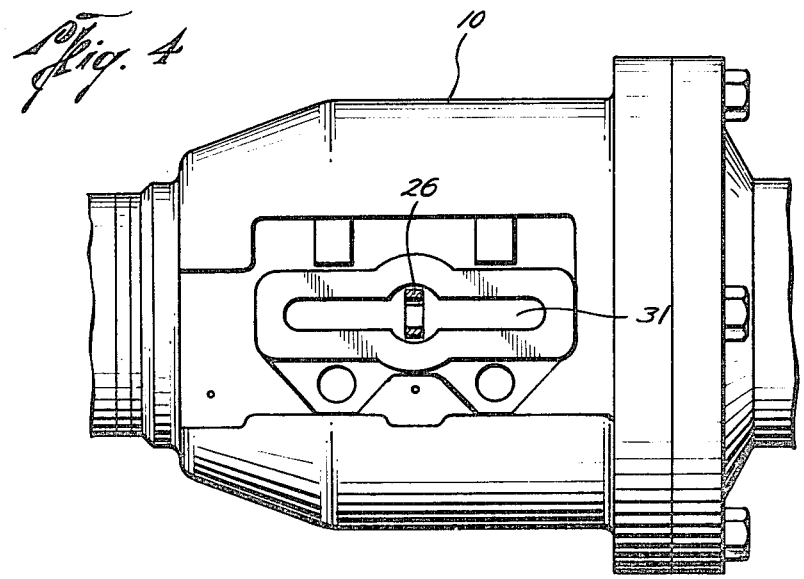
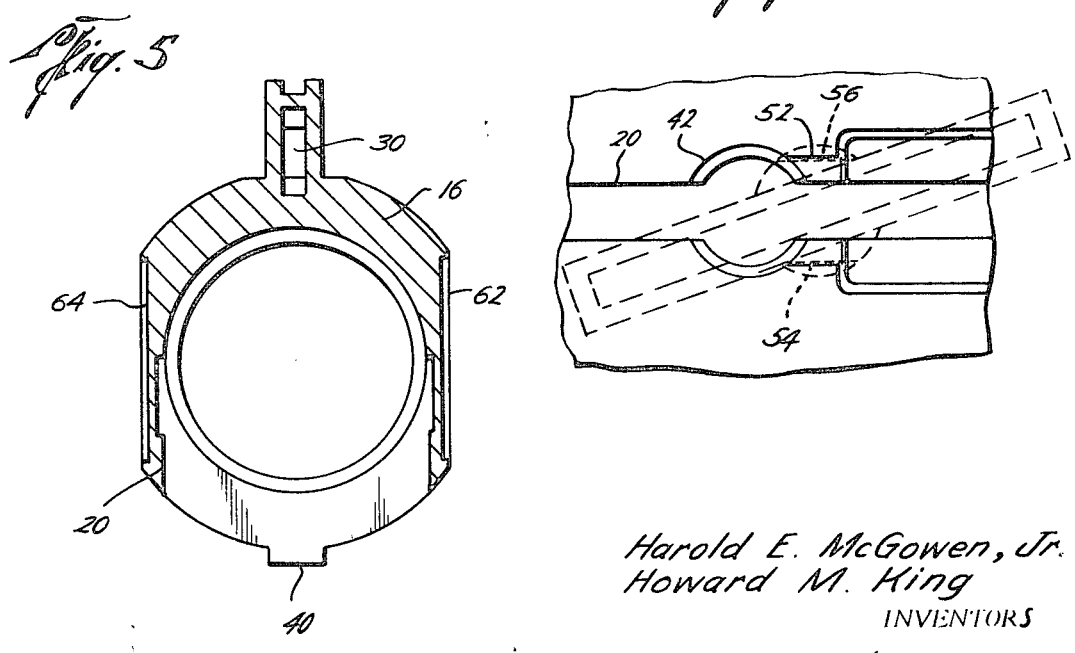

3,610,286

ORIFICE VALVE ASSEMBLY

BACKGROUND OF THE INVENTION

The use of a rotary ball or plug type valve arranged for insertion and removal of interchangeable orifice plates into and out of the valve plug is shown in U.S. Pat. No. 3,209,779. The present invention is an improvement on the foregoing patent by providing a second stem integrally connected to the valve plug for eliminating any floating action of the plug when operating under line pressure fluctuations, for maintaining a better balance for the plug during rotation, and for eliminating possible bending of the actuating stem.

In addition, while plug valves have been provided in the past with bypass openings when the valve plug is positioned in the orifice plate changing position, the present invention is directed to providing four internal passageways in the plug for increasing the internal flow area and decreasing the size of the plug in order that flow may be maintained through the valve while the orifice plate is being changed.

SUMMARY

The present invention is directed to providing an improved orifice valve assembly having a plug valve having a slot for the insertion and removal of interchangeable orifice plates by providing a second stem integrally connected to the valve plug with the orifice plate slot extending axially and transversely entirely through the second stem and the body having a circular recess for supporting the second stem.

A further object of the present invention is the provision of a groove in the body extending into the supporting recess and having a width less than the diameter of the recess and wherein the second stem has a generally circular circumference but includes two flat parallel sides whereby the second stem may be inserted into the recess through the groove and wherein the parallel sides are at an axial angle to provide bearing surfaces during valve operation between the recess and the second stem.

Yet a further object of the present invention is the provision of four internal bypass openings in the valve plug extending from the upstream side to the downstream side of the plug valve while the orifice plate is being removed or inserted to maintain flow through the valve.

BRIEF DESCRIPTION OF THE DRAWINGS

FIG. 4 is a fragmentary cross-sectional view taken along the line 4—4 of FIG. 1, FIG. 5 is a cross-sectional view taken along the line 5—5 of FIG. 2, and FIG. 6 is a fragmentary cross-sectional view taken along the line 6—6 of FIG. 1.

DESCRIPTION OF THE PREFERRED EMBODIMENT

Figure 1:
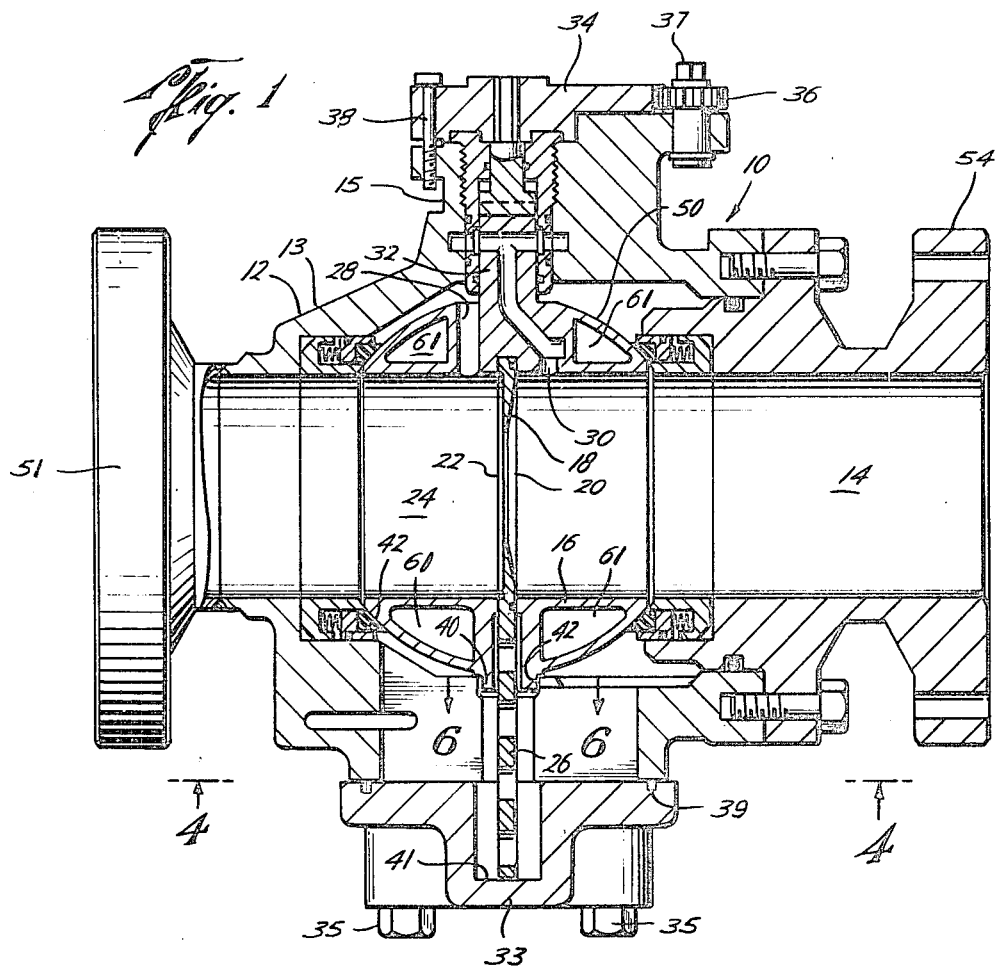
FIG. 1 is an elevational view, in cross section, of the apparatus of the present invention illustrating the orifice valve assembly in the flow measuring position.
Figure 2:
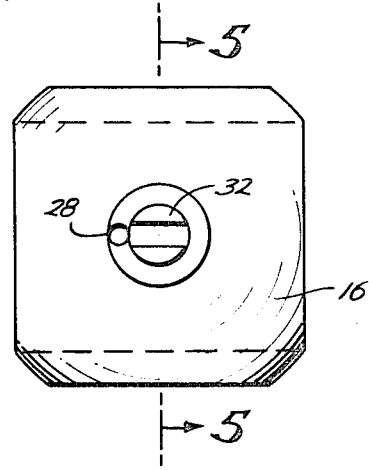
FIG. 2 is an elevational view of the top of the valve plug of FIG. 1.

Referring now to the drawings and particularly to FIG. 1, the reference numeral 10 generally indicates the orifice valve assembly of the present invention and generally includes a valve body 12 having a line passageway 14 therethrough, a rotary ball valve or valve plug 16 adapted to receive and support interchangeable orifice plates 18 for use in measuring the fluid flow through the line passageway 14.

The valve plug 16 includes an internal slot 20 at the axis of plug rotation for receipt of an orifice plate carrier 22 which supports an interchangeable orifice plate 18 in a plug passageway 24. The orifice plate carrier 22 includes a handle 26 extending out of the plug 16 for engagement for removing the carrier 22 and the orifice plate 18 for removing and inserting interchangeable orifice plates of different sizes as desired. The handle 26 of the orifice carrier plate 22 is rotatable with the plug 16 and the body 12. The slotted opening 31 except for the central and large portion, is generally of the size and shape of the slot 20 in the rotary plug 16 and is for alignment therewith only when the plug 16 has been rotated through a 90° position from that shown in FIG. 1. For closing the outer end of the body slot 17, a removable cover 33 together with a suitable seal 39 is held in place by clamp bolts 35 and the innerface of the cover 33 has a pocket 41 to contact the lower end of the handle 26 to hold the plate carrier 22 and orifice plate 20 in proper position, but allows access to the handle 26 for removing the plate carrier and changing the orifice plate 18.

Plug passageways 28 and 30 are provided in the valve plug 16 leading to opposite sides of the orifice plate 18 from suitable pressure-gauging connections on the valve body 12 (not shown) for measuring the pressures on opposite sides of the orifice plate 18.

A valve stem 32 is sealably and rotatably mounted in the housing 12 in the boss 15 and is connected to a suitable valve actuating mechanism such as a lever 34 which is in turn connected to an actuating gear 36 which may be actuated in turn by any suitable means connected to shaft 37 for rotating the plug valve 16 in a 90° movement. Also included is a pin 38 for locking the valve at its limits of travel. A suitable upstream seal 40 and downstream seal 42 are provided in the body 10 to seal against the valve plug 16.

The foregoing is generally shown in the aforementioned Pat. No. 3,209,779. However, it is noted in that patent that the rotary valve 36 is supported and is rotated about a single stem. Because of this cantilever action, there is a tendency for the plug 16 to float back and forth when operating under line pressure fluctuations, and there is a tendency for the stem 34 to become bent.

Figure 3:
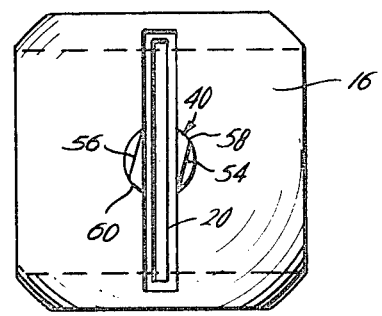
FIG. 3 is an elevational view of the bottom of the valve plug of FIG. 1.

The present invention is directed to providing a second stem, generally indicated by the numeral 40, integrally connected to the valve plug 16 and axially aligned with the first stem 32. As best seen in FIGS. 1 and 3, the slot 20 in the valve plug 16 extends axially and transversely entirely through the second stem 40. In addition, the valve housing 12 includes a circular recess 42 (FIGS. 1 and 6) on the axis of rotation of the valve plug 16 for receiving and supporting the second stem 40. Thus, with the second stem 40 supported in the body 10, the floating action of the plug 16 will be reduced, the plug valve 16 will maintain a better balance for rotation, and the sealing action between the seals 40 and 42 against the valve plug 16 will be improved.

Referring now to FIG. 1, it is to be noted that the housing 10 includes a first portion 13 including the cavity 50 which receives the valve plug 16 and a flange 51. Preferably, the other flange 54 is separately connected to housing member 13 for allowing the valve plug 16 to be inserted into the housing member 13. Since the internal diameter of the housing member 13 is illustrated as only being slightly larger than the ball plug 16 diameter, the ball plug 16 with its first stem 32 is projected first into the member 13 until the end of the stem 32 comes into alignment with the tubular boss 15.

In fact, as shown in the embodiment of FIG. 1, it is preferable that the size of housing member 13 is only slightly larger than plug valve 16 to such a degree that the cavity 50 of the housing 12 is not sufficient to permit insertion of the first stem 32 into the boss 15 and allow rotation of the second stem 40 above and down into circular recess 42. Therefore, and as best seen in FIGS. 1 and 6, a groove 52 is provided in the body member 13 transversely to and extending into the circular recess 42. The groove 52 has a width less than the diameter of the recess 42 for a reason which is described hereinafter.

In order to insert the second stem 40 into the circular recess 42 and still maintain bearing surfaces therebetween, the second stem 40 generally includes a circular circumference but includes two flat parallel sides 54 and 56 (FIGS. 3 and 6) spaced apart a distance slightly less than the width of the groove 52 whereby the parallel sides 54 and 56 may be aligned with the groove 52 (as shown in the dotted outline in FIG. 6) for passage of the stem 40 therethrough and into the circular recess 42. Preferably the parallel sides 54 and 56 are at an axial angle to both the valve plug position and close position, and as best seen in FIG. 3, preferably 15° off of the plug valve open position. Thus, the second stem 40 will include arcuate portions 58 and 60 which are always in contact with the interior of the annular recess 42 to provide bearing surfaces to maintain the second stem and thus the plug valve 16 in a stable position regardless of whether the plug valve 16 is in the open or closed position. Since the valve plug 16 is operated only through a 90° angle of travel between open and close positions, it is preferable that the parallel sides 54 and 56 be at such an angle to the axis of rotation that the sides 54 and 56 never become aligned with the groove 52 during operation of the valve plug 16. Thus as shown in the drawings, if the valve plug 16 is rotated from the flow measuring position of FIG. 1 to an orifice changing position by rotation in a clockwise direction, as viewed from the top, the sides 54 and 56 will never become aligned with the groove 52 during operation and the arcuate portions 58 and 60 if the stem 40 will always be in contact with the recess 42 to provide bearing surfaces therebetween.

The ball plug valve 16 when rotated 90° from the position shown in FIG. 1 may entirely block the flow of fluid through the line passageway 14, if desired, while the orifice plate is being changed or may include bypasses to permit continuation of flow through the passageway 14 during plate changes. If a bypass is desired, it is preferable to provide four internal bypass openings 61 (FIG. 1) which extend from the upstream side to the downstream side of the ball plug valve 16 when the orifice plate is being changed. The passageways 61, as best seen in FIG. 5, include inlets 62 and outlets 64, are internal in the plug valve 16, and therefore do not interfere with the orifice plate measuring operation, but provide a satisfactory volume of flow while the orifice plate is being changed and also allow decreasing the diameter of the plug valve 16.

Thus, in use, fluid flow in the line passageway 14 will flow through the valve passage 24 and the orifice plate 18 and the pressure differential across the plate may be measured through the passageways 28 and 30 to determine the volume of flow. In the event that it becomes desirable to change the orifice plate 18 to one of a different size for flow measuring purposes, the plug valve 16 is rotated 90°, the cover plate 33 is removed, the orifice plate carrier 22 is retracted from the slot 20 and the orifice plate 18 is changed to the desirable size and reinserted in the plug valve 16. The plug valve 16 is then rotated again to place the valve passageway 24 and the orifice plate 18 back in line with the line passageway 14 for measuring purposes. During both the open and close positions, the bearing surfaces 58 and 60 of the second valve stem 40 are in engagement with the interior of the recess 40 to provide surfaces keeping the second valve stem 40 in alignment with the recess 42. It is also to be noted that the parallel sides 56 and 54 are so axially directed such that they remain out of alignment with the access groove 52 during rotation of the plug valve 16 thereby maintaining rotational bearing surfaces at all times between the stem 40 and its recess 42.

The present invention, therefore, is well adapted to carry out the objects and attain the ends and advantages mentioned as well as others inherent therein.

What is claimed is:

1. In an orifice valve assembly having a body having a flow passage therethrough, a valve plug rotatably housed on a first stem by the body on an axis transverse to said passage and provided with an opening which is shiftable with the plug into and out of alignment with the passage in the body, said plug having an internal slot at the axis of plug rotation transversely of said passageway and opens through the plug at a side opposite the first stem for receiving an orifice plate, the improvement comprising, a second stem integrally connected to said valve plug and axially aligned with the first stem, said slot axially and transversely extending entirely through the second stem, said body having a circular recess on the axis of rotation of the valve plug for receiving and supporting the second stem, and four internal bypass openings in the valve plug positioned extending from the upstream side to the downstream side of the plug valve when the slot is aligned with the passageway for providing maximum bypass flow while the orifice plate is being changed.

2. In an orifice valve assembly having a body having a flow passage therethrough, a valve rotatably housed on a first stem by the body on an axis transverse to said passage and provided with an opening which is shiftable with the plug into and out of alignment with the passage in the body, said plug having an internal slot at the axis of plug rotation transversely of said passageway and opens through the plug at a side opposite the first stem for receiving an orifice plate, the improvement comprising, a second stem integrally connected to said valve plug and axially aligned with the first stem, said slot axially and transversely extending entirely through the second stem, said body having a circular recess on the axis of rotation of the valve plug for receiving and supporting the second stem, said body including a groove positioned transversely to and extending into said recess and having a width less than the diameter of the recess, and said second stem having a generally circular circumference but including two flat parallel sides spaced apart a distance less than the width of said groove whereby said second stem may be transversely inserted into said recess through the groove, said parallel sides being at an axial angle to both the valve plug open and close positions thereby providing bearing surfaces for the second stem at both valve open and close positions.

3. The apparatus of claim 2 wherein the groove is positioned on the upstream side of the recess.

4. The apparatus of claim 2 wherein the groove is wider than the slot.

5. The apparatus of claim 2 including four internal bypass openings in the valve plug positioned extending from the upstream side to the downstream side of the plug valve when the slot is aligned with the passageway.

6. The apparatus of claim 2 wherein the parallel sides are at an axial angle such that the sides remain out of alignment with the groove during rotation of said valve plug.